United States Patent
Koch et al.

(10) Patent No.: US 7,480,057 B2
(45) Date of Patent: Jan. 20, 2009

(54) INTERFEROMETRIC DEVICE

(75) Inventors: Peter Koch, Luebeck (DE); Edmund Koch, Dresden (DE)

(73) Assignee: Universitaet zu Luebeck, Luebeck (DE)

( * ) Notice: Subject to any disclaimer, the term of this patent is extended or adjusted under 35 U.S.C. 154(b) by 91 days.

(21) Appl. No.: 10/587,120

(22) PCT Filed: Jan. 20, 2005

(86) PCT No.: PCT/DE2005/000076

§ 371 (c)(1),
(2), (4) Date: Jun. 15, 2007

(87) PCT Pub. No.: WO2005/070286

PCT Pub. Date: Aug. 4, 2005

(65) Prior Publication Data

US 2008/0024865 A1    Jan. 31, 2008

(30) Foreign Application Priority Data

Jan. 23, 2004 (DE) ............... 10 2004 003 484
Jul. 9, 2004 (DE) ............... 10 2004 033 187

(51) Int. Cl.
*G01B 9/02* (2006.01)

(52) U.S. Cl. .................. 356/497; 356/521
(58) Field of Classification Search .......... 356/479, 356/497, 521
See application file for complete search history.

(56) References Cited

U.S. PATENT DOCUMENTS

2002/0085208 A1* 7/2002 Hauger et al. ............ 356/479
2004/0150829 A1* 8/2004 Koch et al. ............... 356/477

* cited by examiner

*Primary Examiner*—Hwa S Lee (Andrew)
(74) *Attorney, Agent, or Firm*—Diederiks & Whitelaw, PLC

(57) ABSTRACT

Device for white light interferometry comprising a light source of main emission wavelength $\lambda_0$ and spectral width $\Delta\lambda$ and an evaluating unit with a line sensor of pixel width P for detecting an interference fringe pattern with a fringe spacing F, a mask being placed in front of the line sensor having a periodically modulated light transmittance along said line sensor, characterized in that the period length M of the mask is such as to fulfill the condition $$\frac{\Delta\lambda}{\lambda_0} < \left|1 - \frac{F}{M}\right| < \frac{1}{2}\frac{F}{P} - \frac{\Delta\lambda}{\lambda_0}.$$

8 Claims, 4 Drawing Sheets

RECTANGULAR MASK

SINE MASK

INTERFEROMETRIC DEVICE

Figure 1:
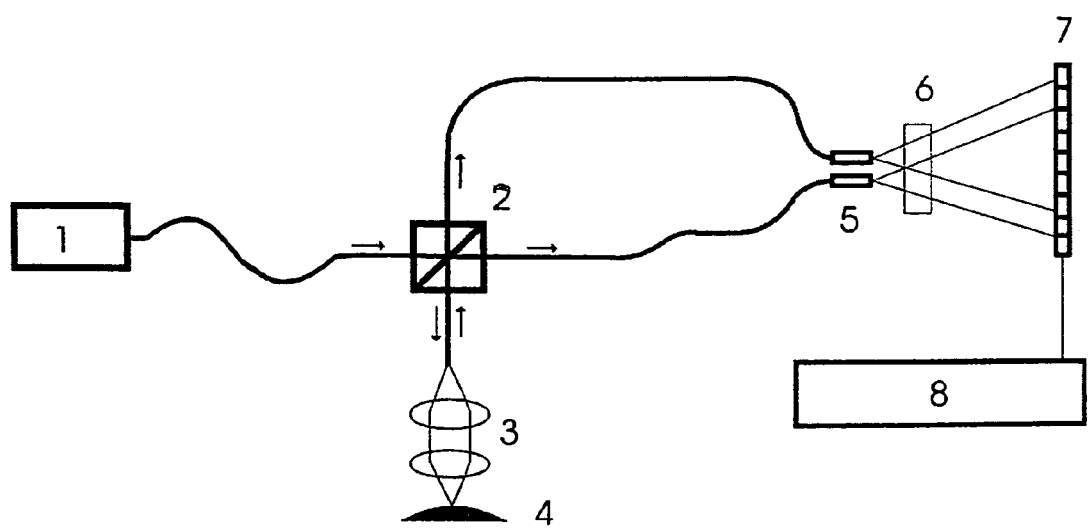

The invention relates to an interferometric device according to the preamble of the main claim. Devices for optical coherence tomography (OCT) comprise an interferometer and an evaluating unit for the electronic detection of an interference pattern.

Interferometers and methods for determining the transit time distribution of reflected or scattered light are known under the term "Optical Coherence Tomography (OCT)". For example, DE 199 29 406 A1 describe such a method for the microscopic resolution of surface structures and for measuring backscattering from different depth layers of a sample or specimen. The interferometer described therein is based on the known Michelson interferometer and uses light from the near infrared spectrum with a very short coherence length. The light is firstly split into a specimen component and a reference component, deflected onto the specimen or a mirror, backscattered there and reflected, following coupling into light guide fibres is passed into a detection unit where interference is brought about. The interferometer according to DE 199 29 406 A1, unlike in the case of time-resolved OCT interferometers, operates without moving parts (NoMotion OCT), particularly without the conventional phase modulator for varying the light transit time in the reference arm. Instead the light returning from the specimen branch and the reference branch enters the evaluating unit at two different locations and in said unit is spatially superimposed and using the spatial intensity distribution in said superimposed area the transit time distribution of the light in the specimen branch is determined. In analogy to the known double slit test, this gives a pattern of interference fringes on a detection screen.

As a result of the transit time distribution of the specimen light there is an intensity distribution along the interference pattern, i.e. the depth-resolved information concerning the specimen is contained in the spatial, time-stationary structure of the interference light. A typical form of this screen, particularly for computer-assisted evaluation, is a linear image sensor. Another standard term is the subsequently used line sensor, which can comprise several lines or rows of pixels.

The light intensity incident on the line sensor in the OCT comprises a dominant background constant along the line sensor and carrying no specimen information, as well as a component variable with the line coordinate (or pixel index) which is generally several orders of magnitude smaller than the background. The variable component can be described as a product of a rapidly oscillating carrier wave—interference fringes with a fringe spacing F or wave number $\kappa_F = 2\pi/F$—with a slowly varying amplitude modulation $\alpha(x)$ as a function of the line coordinate x, so that a standardized intensity is roughly given by $$I_0(x) := 1 + \alpha(x)\cos(\kappa_F x + \phi) \qquad (1)$$

in which $\phi$ is the unknown phase. The signal which is of interest in OCT is obtained from the measurable charge produced by light absorption in each pixel initially in the form of a pixel arrangement-indexed sequence S(n), n=0, ..., N−1 with N as the pixel number on the line sensor. In the case of pixels of width P the nth sequential element is roughly as follows $$S(n) := \int_{-P/2+nP}^{P/2+nP} I_0(x)\, dx \qquad (2)$$

and with the aid of a computer-assisted evaluation the sought modulation $\alpha(x)$ is subsequently approximated. It is assumed that a can be considered over and beyond a single pixel in good approximation as constant $\alpha(n)$. The integration function mainly relates to the rapidly changing carrier wave. The sampling or scanning theorem requires that said carrier wave per fringe spacing F is scanned at at least two points in order to lose nothing of the information content.

In the case of an OCT device without moving parts, F is typically a few dozen micrometers and the pixel width of standard sensors is below 10 micrometers. With such a device it is possible to obtain a scanning depth of approximately 100 µm, whereas this is up to 2 mm in time-resolved systems. In order to obtain such scanning depths with line sensor systems, it is necessary for the line sensor to cover many more fringes, i.e. the fringe spacing F must be made smaller and the sensor must have more pixels in a confined space. An estimate for said number N is:

$$N = 2 \cdot 2 \cdot \frac{nD}{\lambda}, \qquad (3)$$

in which $\lambda$ is the average wave length, D the scanning depth and n the refractive index of the specimen, leading to line sensors with approximately 10,000 pixels. Admittedly nowadays such CCD sensors exist, but the costs of rapidly digitizing the signals are high and the maximum storable light quantity with such sensors is low. CMOS sensors would be more suitable, but it is not readily possible to obtain therewith such high pixel numbers.

It is known from DE 37 30 091 A1 that the recording of a spatial interference pattern with a line sensor can be improved by utilizing the moir, effect. For this purpose an optical grating (also mask) with a periodic light-dark structure is placed in front of the line sensor and the grating constant (also mask period M=width of a light-dark cycle) is made such that it corresponds as accurately as possible to the interferogram fringe spacing F. This procedure is equal to optical downward mixing of signals to a low frequency intermediate band and according to the teaching of DE 37 30 091 A1 mixing preferably takes place to the difference frequency zero. As a result only the sought envelope $\alpha(x)$ of the intensity modulation is imaged on the line sensor and this can easily be scanned with the conventional pixel number. However, disadvantages are associated with the use of a mask according to DE 37 30 091 A1. The light incident on each pixel comprises an interference light component and an incoherent background component (cf. equation (1)), the latter dominating. The two components cannot be separated on a single pixel. Instead neighbouring pixels must be compared and differences formed. However, this is unsuccessful in practice in that for illumination reasons the background intensity is not the same on all pixels. In addition, the interference light contribution to the signal S(n) on the nth pixel according to equations (1) and (2), is dependent on the random phase position of the intensity modulation $I_0$ relative to the mask. In the least favourable case with integration over the pixel width this contribution can even disappear.

To obviate these disadvantages DE 37 30 091 A1 proposes the time variation of the interferometer reference arm length. This can be used for planned path length change by e.g. $\pm\lambda/4$, which would displace the phase position by $\pm 90°$. Moreover, through the periodic changing of the reference arm with a clearly defined frequency on each pixel, a time-variable signal can be covered, whose variation can only be attributed to the interference light. This variation can then be filtered out.

However, if no movable components are desired or in particular no variable reference arm, the use of a mask according to DE 37 30 091 A1 is disadvantageous for the already indicated reasons.

The problem of the present invention is to provide an interferometric device with a line sensor, particularly for OCT, which has no moving parts and in particular no time-variable reference arm, but which still allows a simple separation of useful signal and background when there are several interference fringes on each individual pixel.

This problem is solved by an interferometer according to claim 1. Advantageous developments are provided by the subclaims.

The invention is described in greater detail hereinafter relative to the attached drawings, wherein show:

FIG. 1 The diagrammatic structure of a NoMotion-OCT interferometer based on the Michelson interferometer.

Figure 2:
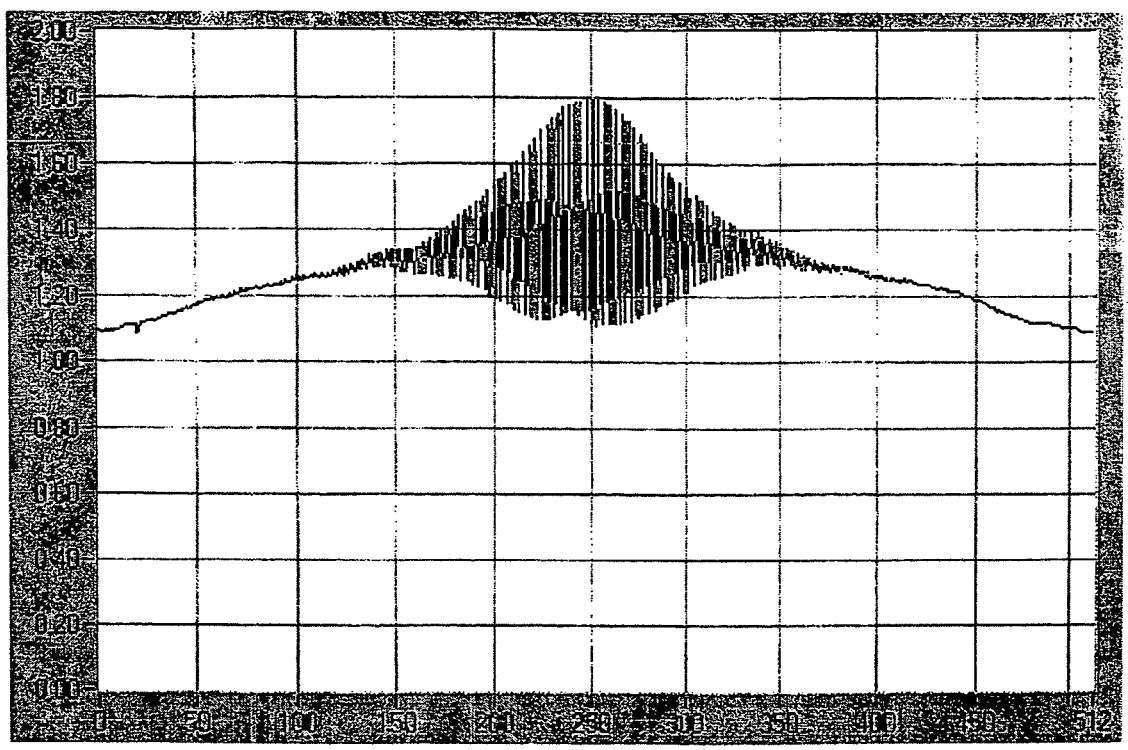

FIG. 2 A typical signal such as can be measured on the line sensor if there is a mirror in the specimen arm, the interference light signal component intensity is plotted against the line sensor pixel index.

Figure 3:
Figure 3:
Figure 3:
Figure 3:
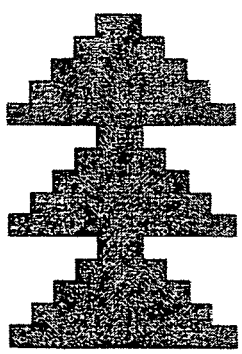
Figure 3:
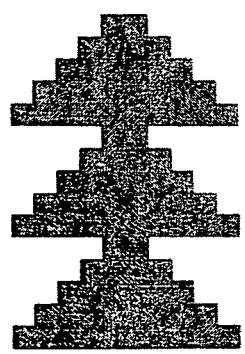
Figure 3:
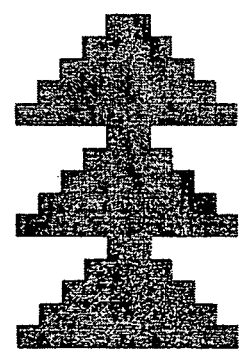

FIG. 3 An example for producing a mask on the line sensor pixels by covering with metallic dots.

Figure 4:
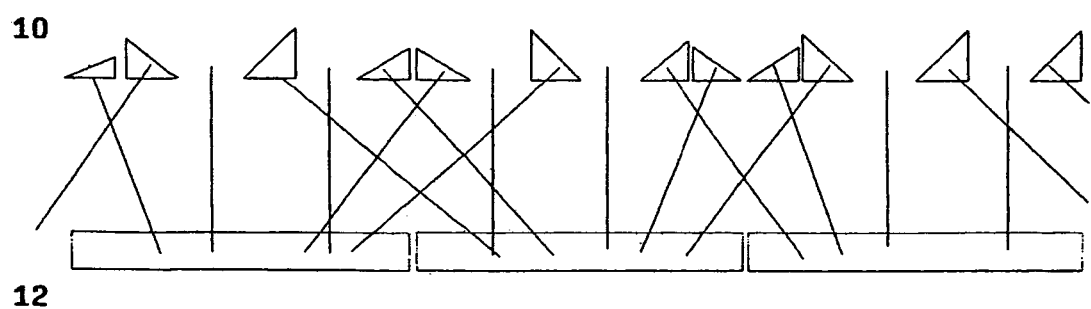

FIG. 4 The operation of a prism mask as an alternative to a fade-out mask.

FIG. 1 shows an interferometric device suitable for OCT and having no moving parts. The light from a broad band light source 1 with a short coherence length is split into a reference beam and a specimen or sample beam by a beam splitter 2 (or fibre coupler). The specimen beam is deflected via imaging optics 3 to the specimen 4 and is backscattered by the latter. By means of separate light guide fibres the specimen and reference light is passed into an evaluating unit, where the beams exit from spaced fibre ends 5 and pass via a cylindrical lens 6 to a detector 7 (line sensor). As in the conventional double slit experiment, an interference fringe pattern along the sensor line is formed on the detector and is electronically detected and further processed by a recording device 8.

FIG. 2 shows the typical result of a measurement if the specimen is replaced by a mirror. Reference numeral 10 indicates a row of prisms and 12 the pixels.

It is more particularly pointed out that the fringe spacing F of the interference fringes on the line sensor 7 is determined from the light wave lengths used and the mutual spacing of the exit ends 5 and the spacing from the detector 7. Assuming planar light wave fronts, F is solely a function of the angle formed by the light beams and which can be calculated from said spacings. In FIG. 1 the exit ends 5 are oriented in parallel in exemplified manner. For example, F can be further reduced if one of the two fibre ends 5 were additionally laterally displaced.

In order to achieve a scanning depth comparable with that of time-resolved OCT devices, F will be made such that there several fringes on each individual pixel. The now occurring scanning problem is solved with the aid of a periodic mask, which is preferably positioned directly in front of or on the pixels of the line sensor. Unlike in DE 37 30 091 A1, the choice of the mask period M is oriented only indirectly through the fringe spacing F, as will be explained hereinafter. A precise coincidence of M and F, as required in DE 37 30 091 A1, is to be avoided. Preferably F will always be such that it differs significantly from M.

The mask is preferably such that its light transmittance varies between opaque and transparent (maximum contrast) and on average the mask transmits half the light intensity. This can in particular be achieved if the path of the transmittance (→mask function) along the line sensor follows a simple mathematical function such as a rectangular, sawtooth or sine function.

The light incident on the sensor with an intensity distribution according to equation (1) is multiplied by the mask function on traversing the mask. With the wave number of the mask period $\kappa_M = 2\pi/M$ the mix signals measurable on the sensor now contain components of the difference frequency $\kappa_F - \kappa_M$ and the sum frequency $\kappa_F + \kappa_M$, the latter being removed from the evaluation by low pass filtering and plays no part.

Thus, the task remains of detecting with the sensor and evaluating an intensity signal in the form $$I^M{}_0(x) \sim \alpha(x)\cos((\kappa_F - \kappa_M)x) \qquad (4)$$

This corresponds to a low frequency carrier wave multiplied by the amplitude modulation $\alpha(x)$ containing the specimen information.

In order to scan each full carrier wave with at least two pixels, it is necessary to have $$2P < \frac{2\pi}{|\kappa_F - \kappa_M|}, \qquad (5)$$

and the interference pattern will be set up in such a way that $|\kappa_F - \kappa_M|$ differs from zero because, as stated, otherwise it would not be possible to do without the time variation of the reference arm.

If the pixel wave number is called $\kappa_P = 2\pi/P$, the function of the inventive mask can be understood in such a way that it is to bring about a wave number tilt of the true fringe wave number in the scannable Nyquist interval $$0 < |\kappa_F - \kappa_M| < \frac{1}{2}\kappa_P \qquad (6)$$

However, the realization of the condition in inequality (6) does not necessarily suffice for good measured results in OCT. The picture used up to now of a single, amplitude-modulated carrier wave to be scanned is frequently appropriate, but a different picture is more suitable here.

OCT is a special case of white light interferometry, i.e. the light source now emits a finite width spectrum of wavelengths distributed around a central wavelength $\lambda_0$. It is e.g. possible to assume that the spectrum usable for the measurement is given by $[\lambda_0 - \Delta\lambda, \lambda_0 + \Delta\lambda]$ if designates the spectral width of the light source. The amplitude-modulated fringe pattern with the fringe spacing F arising on the line sensor is a superposition of fringe patterns with wave numbers from a continuous interval $[\kappa^0{}_F - \Delta\kappa, \kappa^0{}_F + \Delta\kappa]$, in which $\kappa^0{}_F -$ is the dominant, average fringe wave number referred to up to now and to be associated with the wave length $\lambda_0$, so that the following roughly applies:

$$\Delta\kappa \approx \frac{\Delta\lambda}{\lambda_0}\kappa^0_F \qquad (7)$$

To satisfy the scanning condition the mask is to be set up in front of the sensor line in such a way that there can be a simultaneous tilt in the Nyquist interval for all the contributing wave numbers $\kappa_F \in [\kappa^0{}_F - \Delta\kappa, \kappa^0{}_F + \Delta\kappa]$. However, during tilting there must be no downwardly mixed wave numbers with different signs, i.e. it is necessary to have $$0 < \frac{\kappa_F - \kappa_M}{\kappa_P} < \frac{1}{2} \text{ or } 0 > \frac{\kappa_F - \kappa_M}{\kappa_P} > -\frac{1}{2} \quad (8)$$

for in each case all $\kappa_F \in [\kappa^0_F - \Delta\kappa, \kappa^0_F + \Delta\kappa]$ with a fixed chosen mask or a fixed $\kappa_M$. If wave numbers of the same sum, but opposing signs occurred, the signal contributions of the associated light components would not be distinguishable from one another during the further evaluation and in particular after low pass filtering. There would be a loss of a significant proportion of the specimen information distributed over the complete useful spectrum.

Clearly the indicated requirements are particularly fulfilled if, in place of inequalities (8), it is required $$\Delta\kappa < |\kappa^0_F - \kappa_M| < \frac{1}{2}\kappa_P - \Delta\kappa \quad (9)$$

or the use of equation (7)

$$\frac{\Delta\lambda}{\lambda_0} < \left|1 - \frac{\kappa_M}{\kappa^0_F}\right| < \frac{1}{2}\frac{\kappa_P}{\kappa^0_F} - \frac{\Delta\lambda}{\lambda_0}, \quad (9)$$

in which $\lambda_0$, $\Delta\lambda$ and $\kappa_P$ are apparatus-predetermined and $\kappa^0_F$ can be selected or determined by the scientist. According to the invention inequality (9) fixes a favourable interval for the choice of a mask in front of the line sensor and it is particularly stressed that $\kappa_M$ can be larger or smaller than $\kappa^0_F$, whilst excluding coincidence.

On now returning to the previously used picture of a single carrier wave on the line sensor according to equation (4), inequality (9) can be written:

$$\frac{\Delta\lambda}{\lambda_0} < \left|1 - \frac{F}{M}\right| < \frac{1}{2}\frac{F}{P} - \frac{\Delta\lambda}{\lambda_0}. \quad (10)$$

EXAMPLE

To record with a line sensor of pixel width P=8 μm an interference pattern with a fringe spacing F=2.5 μm, it is necessary to establish a suitable mask. The light source emits at $\lambda_0$=830 nm with a spectral width $\Delta\lambda$=40 nm, i.e. the spectrum used for OCT is between 790 and 870 nm. According to inequality (10) it immediately arises that the mask period and fringe spacing must differ by a value between 4.8 and 10.8%.

The signal according to equation (4) resulting from the mask according to the invention can now be detected with the line sensor and processed with a band pass filter, which now isolates intensity contributions in the frequency environment of the carrier frequency $|\kappa_F - \kappa_M|$. The sought envelope is then obtained by forming the sum from the filtered signal. The background is subtracted in this way and the phase position with respect to the mask and sensor plays no part, because it only has an effect on the position of the zero passages of the carrier wave. As the latter can now be well scanned with the given pixel resolution, its envelope can always be determined with the same precision.

It can occur that inequality (10) no longer provides solutions, e.g. if the left-side exceeds the right. This will in particular arise if use is made of light sources with an excessive spectral width or an excessive number of fringes is imaged on a single pixel. The mask cannot any longer assist in such cases. Certainly considerable manufacturing problems would arise with high $\kappa_M$.

It is advantageous for the number of mask periods per pixel width P to be an integer, i.e. preferably P=nM with n=1, 2, 3, etc. Otherwise measurement artefacts could arise, particularly through the mask shadow which falls on the pixels as a result of the uniform, incoherent background illumination. This would in particular have a disadvantageous effect for pixels with a constant sensitivity over the pixel width. Thus, in the above example the choice M=P/3 =2,67 μm would be very favourable and would fall within the specification of inequality (9), when $|1-\kappa_M/\kappa^0_F|$=6.25%.

An advantageous embodiment of the mask according to the invention consists of producing a metallizing layer on the pixels during semiconductor manufacture. Metallizing layers are in any case provided in CMOS processes and are normally used then for contacting individual transistors, but can also be used without difficulty for covering parts of pixels. As they are already part of the CMOS process, no extra costs arise during manufacture. This is of particular interest, because in principle there can only be minimum modifications to the layout of a commercial sensor. To produce a path of the stop transmission along the sensor line following a specific function, it is appropriate to e.g. bring about the covering by metallic dots statistically distributed perpendicular to the line axis and whose density changes along the sensor in accordance with the sought mask function. In the same way it is possible to apply to the pixels fixed periodic patterns, as shown in exemplified form in FIG. 3. In fact the mask function details are unimportant for the favourable effect. However, vital importance is attached to a good periodicity with the inventive period length.

According to another advantageous development involves suitably curving the line sensor with mask in order to compensate distortions of the interference pattern emanating from the point light sources in the outer area of the planar screen.

As working typically takes place in OCT with very small useful signal intensities, it is desirable to fade out no light components through a mask. Thus, as a more complicated, but very useful variant a specially structured mask is proposed which absorbs no light and instead only brings about a different light distribution. This advantageously comprises an arrangement of miniprisms or lenses, which is located in front of a line sensor with at least two lines of pixels. In place of a periodic fading out half the light is passed to the second detector line, as is diagrammatically shown in FIG. 4. The period with which the deflection directions of the miniprisms alternate, corresponds to the previously calculated inventive mask period. Such lines of miniprisms can be implemented in much the same way as lens arrays with the aid of lasers or etching processes and such as are known from silicon technology. For 1.3 μm light wavelength the mask can also be made from silicon.

In addition to deflection via refraction, deflection can also be brought about by diffraction gratings (preferably phase gratings for intensity reasons). Holographic-optical elements (HOE) are very appropriately used, because mechanical methods for the manufacture of corresponding transmission gratings are complicated. Such phase gratings can be produced inexpensively and in large numbers on photographic film.

The invention claimed is:

1. A device for white light interferometry comprising a light source of main emission wavelength $\lambda_0$ and spectral width $\Delta\lambda$ and an evaluating unit with a line sensor of pixel width P for detecting an interference fringe pattern with a fringe spacing F, a mask being placed in front of the line sensor having a periodically modulated light transmittance along said line sensor, wherein the period length M of the mask is such as to fulfill the condition $$\frac{\Delta\lambda}{\lambda_0} < \left|1 - \frac{F}{M}\right| < \frac{1}{2}\frac{F}{P} - \frac{\Delta\lambda}{\lambda_0}.$$

2. The device according to claim 1, wherein the period length M is an integral fraction of the pixel width P.

3. The device according to claim 1, wherein the mask is formed by covering the line sensor with a plurality of opaque points defined by metallic dots.

4. The device according to claim 3, wherein the opaque points are statistically distributed perpendicular to an axis of the line sensor and a covering density along the axis is in accordance with a periodic function selected from the group consisting of a sine, rectangular and sawtooth function.

5. The device according to claim 3, wherein the opaque points are applied in a regular arrangement which is periodically repeated along the line sensor.

6. The device according to claim 1, wherein the line sensor comprises at least two pixel lines and the mask is constructed as an alternate arrangement of transparent and light-deflecting elements, wherein deflected light is detected by the second pixel line.

7. The device according to claim 6, wherein light deflection takes place by refraction.

8. The device according to claim 6, wherein light deflection takes place by diffraction on gratings.

* * * * *